(12) United States Patent
Nagaraj et al.

(10) Patent No.: US 7,587,752 B2
(45) Date of Patent: Sep. 8, 2009

(54) METHODS AND APPARATUS FOR PROVIDING A CONTROL CHANNEL IN A DATA NETWORK

(75) Inventors: Thadi M. Nagaraj, San Diego, CA (US); Ravinder Paul Chandhok, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/366,374

(22) Filed: Mar. 1, 2006

(65) Prior Publication Data

US 2006/0206716 A1 Sep. 14, 2006

Related U.S. Application Data

(60) Provisional application No. 60/658,989, filed on Mar. 4, 2005.

(51) Int. Cl.
*H04K 1/00* (2006.01)
*H04L 9/00* (2006.01)

(52) U.S. Cl. .................. 726/2; 726/3; 380/270; 709/203; 709/220; 709/229

(58) Field of Classification Search ............... 380/255, 380/270; 726/2–5; 709/203, 220, 229; 370/328; 375/145; 455/434
See application file for complete search history.

(56) References Cited

U.S. PATENT DOCUMENTS

| | | | | |
|---|---|---|---|---|
| 6,952,708 | B2 * | 10/2005 | Thomas et al. ............ | 707/104.1 |
| 7,181,501 | B2 * | 2/2007 | Defosse ..................... | 709/217 |
| 7,340,510 | B1 * | 3/2008 | Liskov et al. .............. | 709/220 |
| 7,376,104 | B2 * | 5/2008 | Diachina et al. ............ | 370/332 |
| 2002/0019786 | A1 * | 2/2002 | Gonzalez et al. ............. | 705/28 |
| 2002/0054087 | A1 * | 5/2002 | Noll et al. ................... | 345/744 |
| 2003/0041125 | A1 * | 2/2003 | Salomon ..................... | 709/220 |
| 2004/0052504 | A1 * | 3/2004 | Yamada et al. ............... | 386/68 |
| 2004/0137917 | A1 | 7/2004 | Ohto et al. | |
| 2004/0145768 | A1 * | 7/2004 | Stringham ................. | 358/1.14 |
| 2004/0230965 | A1 * | 11/2004 | Okkonen .................... | 717/168 |
| 2005/0005169 | A1 * | 1/2005 | Kelekar ...................... | 713/201 |
| 2005/0083924 | A1 * | 4/2005 | Dillinger et al. ............ | 370/389 |
| 2005/0175240 | A1 * | 8/2005 | Parry et al. ................. | 382/182 |

(Continued)

FOREIGN PATENT DOCUMENTS

EP 0 615 364 A1 9/1994

(Continued)

OTHER PUBLICATIONS

International Search Report - PCT/US06/007896, International Search Authority - European Patent Office, Aug. 7, 2006.

(Continued)

*Primary Examiner*—Minh Dieu Nguyen
(74) *Attorney, Agent, or Firm*—Gerald P. Joyce, III

(57) ABSTRACT

Methods and apparatus for providing a control channel in a data network. A method is provided that operates to provide a control channel in a data network. The method includes receiving one or more server digests, and generating a control channel digest from the one or more server digests. The method also includes communicating with a device, and transmitting the control channel digest to the device.

8 Claims, 10 Drawing Sheets

U.S. PATENT DOCUMENTS

| | | | |
|---|---|---|---|
| 2005/0198303 A1* | 9/2005 | Knauerhase et al. | 709/227 |
| 2005/0271004 A1* | 12/2005 | Cho | 370/328 |
| 2006/0036676 A1* | 2/2006 | Cardone et al. | 709/203 |
| 2006/0068703 A1* | 3/2006 | Ng et al. | 455/41.2 |
| 2006/0294566 A1* | 12/2006 | Zlattner | 725/112 |

FOREIGN PATENT DOCUMENTS

| | | |
|---|---|---|
| JP | 2003-125115 | 4/2003 |
| JP | 2004-349932 | 12/2004 |
| WO | 2005/015880 A1 | 2/2005 |

OTHER PUBLICATIONS

International Preliminary Report on Patentability - PCT/US06/007896, The International Bureau of WIPO - Geneva, Switzerland, Sep. 12, 2007.

Written Opinion - PCT/US06/007896, International Search Authority - European Patent Office, Aug. 7, 2006.

* cited by examiner

METHODS AND APPARATUS FOR PROVIDING A CONTROL CHANNEL IN A DATA NETWORK

CLAIM OF PRIORITY UNDER 35 U.S.C. §119

The present Application for Patent claims priority to Provisional Application No. 60/658,989, entitled "METHOD AND APPARATUS FOR CONTROL CHANNEL IMPLEMENTATION IN A CLIENT-SERVER SYSTEM" filed Mar. 4, 2005, and assigned to the assignee hereof and hereby expressly incorporated by reference herein.

BACKGROUND

1. Field

The present application relates generally to the operation of data networks, and more particularly, to methods and apparatus for providing a control channel in a data network.

2. Background

Typical wireless delivery systems are client-server based systems. Thus, the actions performed by a client may be dependent on one or more server states. For example, the server state may include content states, program guide states, administrative states, or any other type of server state. Thus, the state of a particular distribution system may include information from a number of servers such as a subscription server, distribution server, administrative server, or any other server. At any given time, the state of one or more of these servers may change.

Unfortunately, a device in a wireless distribution system goes in and out of service due to power-down operation modes or limitations in service coverage. Thus, a client operating at a device may have a problem monitoring what is going on in the network. One approach to solve this problem is for the client at the device to completely synchronize its state with all servers in the system before the client performs any action. However, this is inefficient if some server states have not changed or if server states change infrequently. Additionally, if a server's state has not changed, this technique may require the device to utilize power and network bandwidth to obtain state information it may already have.

Therefore, what is needed is a system that operates to provide a way for the state of a distribution system to be efficiently delivered to a wireless device.

SUMMARY

In one or more embodiments, a control channel system, comprising methods and apparatus, is provided that operates to efficiently delivery the state of a distribution system to a device. In one embodiment, a control channel is defined that carries a control channel (CC) digest (or synopsis) of server states. A client at a device receives this CC digest in a variety of interactions with one or more servers. If the CC digest indicates that one or more server states have changed, only then does the client synchronize its state with the server whose state has changed. Thus, the control channel provides a generic and flexible mechanism that provides a way for the state of a distribution system to be efficiently delivered to a wireless device.

In an aspect, a method is provided that operates to provide a control channel in a data network. The method comprises receiving one or more server digests, and generating a control channel digest from the one or more server digests. The method also comprises communicating with a device, and transmitting the control channel digest to the device.

In an aspect, a method is provided that operates to provide a control channel in a data network. The method comprises receiving one or more server digests, generating a control channel digest from the one or more server digests, and broadcasting the control channel digest over the data network.

In an aspect, a method is provided that operates to provide a control channel in a data network. The method comprises receiving one or more server digests from one or more servers, generating a control channel digest from the one or more server digests, and transmitting the control channel digest to the one or more servers.

In an aspect, a method is provided that operates to provide a control channel in a data network. The method comprises transmitting a server digest, receiving a control channel digest, communicating with a device, and transmitting the control channel digest to the device.

In an aspect, an apparatus is provided that operates to provide a control channel in a data network. The apparatus comprises means for receiving one or more server digests, means for generating a control channel digest from the one or more server digests, means for communicating with a device, and means for transmitting the control channel digest to the device.

In an aspect, an apparatus is provided that operates to provide a control channel in a data network. The apparatus comprises means for receiving one or more server digests, means for generating a control channel digest from the one or more server digests, and means for broadcasting the control channel digest over the data network.

In an aspect, an apparatus is provided that operates to provide a control channel in a data network. The apparatus comprises means for receiving one or more server digests from one or more servers, means for generating a control channel digest from the one or more server digests, and means for transmitting the control channel digest to the one or more servers.

In an aspect, an apparatus is provided that operates to provide a control channel in a data network. The apparatus comprises means for transmitting a server digest, means for receiving a control channel digest, means for communicating with a device, and means for transmitting the control channel digest to the device.

In an aspect, an apparatus is provided that operates to provide a control channel in a data network. The apparatus comprises processing logic configured to receive one or more server digests, and generate a control channel digest from the one or more server digests, and transceiver logic configured to communicate with a device, and transmit the control channel digest to the device.

In an aspect, an apparatus is provided that operates to provide a control channel in a data network. The apparatus comprises processing logic configured to receive one or more server digests and to generate a control channel digest from the one or more server digests, and transceiver logic configured to broadcast the control channel digest over the data network.

In an aspect, an apparatus is provided that operates to provide a control channel in a data network. The apparatus comprises processing logic configured to receiving one or more server digests from one or more servers and generate a control channel digest from the one or more server digests, and transceiver logic configured to transmit the control channel digest to the one or more servers.

In an aspect, an apparatus is provided that operates to provide a control channel in a data network. The apparatus comprises processing logic configured to transmit a server digest and receive a control channel digest, and transceiver logic configured to communicate with a device, and transmit the control channel digest to the device.

In an aspect, a computer-readable medium is provided that has a computer program, which when executed by at least one processor, operates to provide a control channel in a data network. The computer program comprises instructions for receiving one or more server digests, instructions for generating a control channel digest from the one or more server digests, instructions for communicating with a device, and instructions for transmitting the control channel digest to the device.

In an aspect, a computer-readable medium is provided having a computer program, which when executed by at least one processor, operates to provide a control channel in a data network. The computer program comprises instructions for receiving one or more server digests, instructions for generating a control channel digest from the one or more server digests, and instructions for broadcasting the control channel digest over the data network.

In an aspect, a computer-readable medium is provided that has a computer program, which when executed by at least one processor, operates to provide a control channel in a data network. The computer program comprises instructions for receiving one or more server digests from one or more servers, instructions for generating a control channel digest from the one or more server digests, and instructions for transmitting the control channel digest to the one or more servers.

In an aspect, a computer-readable medium is provided that has a computer program, which when executed by at least one processor, operates to provide a control channel in a data network. The computer program comprises instructions for transmitting a server digest, instructions for receiving a control channel digest, instructions for communicating with a device, and instructions for transmitting the control channel digest to the device.

In an aspect, at least one processor is provided that is configured to perform a method for providing a control channel in a data network. The method comprises receiving one or more server digests, generating a control channel digest from the one or more server digests, communicating with a device, and transmitting the control channel digest to the device.

In an aspect, at least one processor is provided that is configured to perform a method for providing a control channel in a data network. The method comprises receiving one or more server digests from one or more servers, generating a control channel digest from the one or more server digests, and transmitting the control channel digest to the one or more servers.

In an aspect, at least one processor is provided that is configured to perform a method for providing a control channel in a data network. The method comprises transmitting a server digest, receiving a control channel digest, communicating with a device, and transmitting the control channel digest to the device.

Other aspects of the embodiments will become apparent after review of the hereinafter set forth Brief Description of the Drawings, Description, and the Claims.

BRIEF DESCRIPTION OF THE DRAWINGS

The foregoing aspects of the embodiments described herein will become more readily apparent by reference to the following detailed description when taken in conjunction with the accompanying drawings wherein.

DESCRIPTION

In one or more embodiments, a control channel system is provided that operates to efficiently delivery a CC digest to wireless devices in a network. In one embodiment, the system allows server digests from multiple servers to be consolidated into a single CC digest that is delivered to wireless devices. The system is especially well suited for use in wireless network environments, but may be used in any type of network environment, including but not limited to, communication networks, public networks, such as the Internet, private networks, such as virtual private networks (VPN), local area networks, wide area networks, long haul networks, or any other type of data network.

Figure 1:
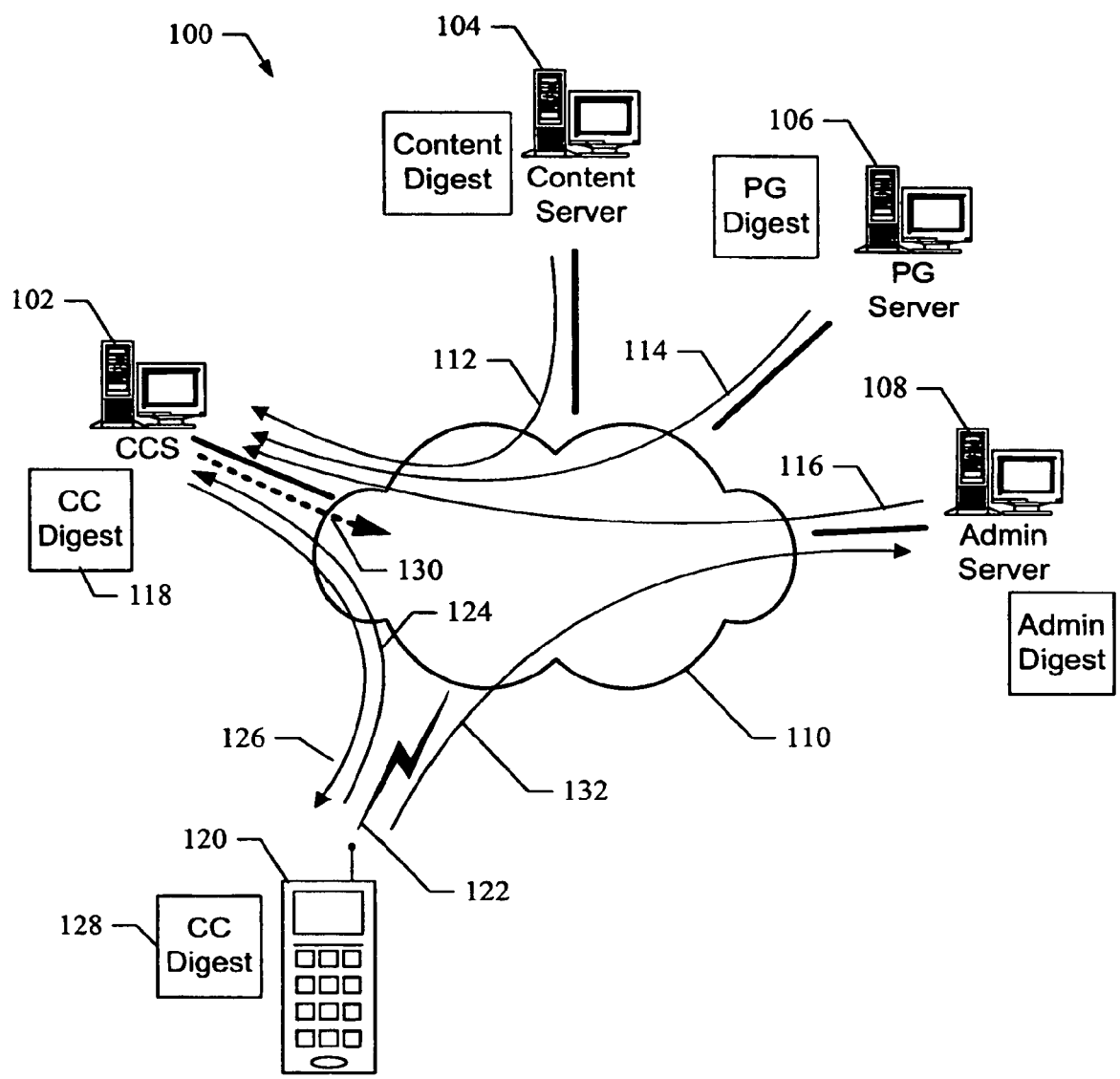
FIG. 1 shows a network that comprises one embodiment of a control channel system.

FIG. 1 shows a network 100 that comprises one embodiment of a control channel system. The network 100 comprises a control channel server (CCS) 102 that is in communication with three information servers (104, 106, and 108) utilizing a data network 110. The information servers (104, 106, and 108) operate to perform various functions for devices in communication with the network 110. For example, the server 104 may be a content server that provides content to the devices on the network 110. The server 106 may be a program guide (PG) server that provides a PG to devices on the network 110. The PG may describe the content that is available from the server 104. The server 108 may be an administrative server that provides administrative services to devices on the network 110. The administrative services may comprise support services, billing and invoicing, licensing information, or any other type of service.

Each of the information servers (104, 106, and 108) maintains a server digest that describes information about the services provided by that server. The server digests are updated to reflect any service changes that may occur. The information servers (104, 106, and 108) operate to transmit their server digests through the data network 110 to the CCS 102. For example, the server 104 transmits its content digest as shown by path 112, the server 106 transmits its PG digest as shown by path 114, and the server 108 transmits its Admin digest as shown by path 116.

The CCS 102 operates to receive the server digests from the information servers (104, 106, and 108) and assemble a CC digest 118 that describes all the content and/or services provided by the servers (104, 106, and 108). The CC digest may be in any suitable format and may be encrypted using any suitable encryption technology.

A wireless device 120 is in communication with the network 110 through a wireless communication link 122. The wireless communication link 122 may comprise any suitable communication technology. The wireless device 120 may comprise any type of device, including but not limited to, a mobile telephone, PDA, email device, pager, notebook computer or any other type of device.

In one embodiment, the CCS 102 operates to broadcast the CC digest 118 over the network 110 so that devices on the network are able to listen to the broadcast and receive the CC digest 118. For example, a broadcast (shown by path 130) may be received by the device 120 using the communication link 122. The device 120 may determine from the broadcast that the broadcasted CC digest is a newer version than what the device has stored locally. Thus, the device may receive portions of the broadcasted CC digest that are new, or the entire CC digest and then update its locally stored copy, as shown at 128.

In another embodiment, the device communicates with the CCS 102 at periodic or random intervals, as shown by the path 124. In response to the communication, the CCS 102 operates to transmit the CC digest 118 to the device, as shown by path 126. The device may then update its locally stored copy of the CC digest 128.

Once the device 120 has obtained the latest CC digest, it may communicate directly with one or more of the information servers (104, 106, and 108) to obtain available content and/or services described in the CC digest, as shown by path 132.

Therefore, a CC server (i.e., server 102) operates to provide one or more embodiments of a control channel system by performing one or more of the following functions.
1. Maintain a CC digest.
2. Receive one or more server digests.
3. Update the CC digest with the latest server digest information.
4. Broadcast/multicast the CC digest over a network.
5. Receive a communication from a device.
6. Transmit the CC digest directly to the communicating device.

Thus, embodiments of the control channel system operate to efficiently provide a device with a CC digest that describes the current state of a distribution system. It should be noted that the configuration of the network 100 is just one configuration, and that other network configurations are possible within the scope of the embodiments.

Figure 2:
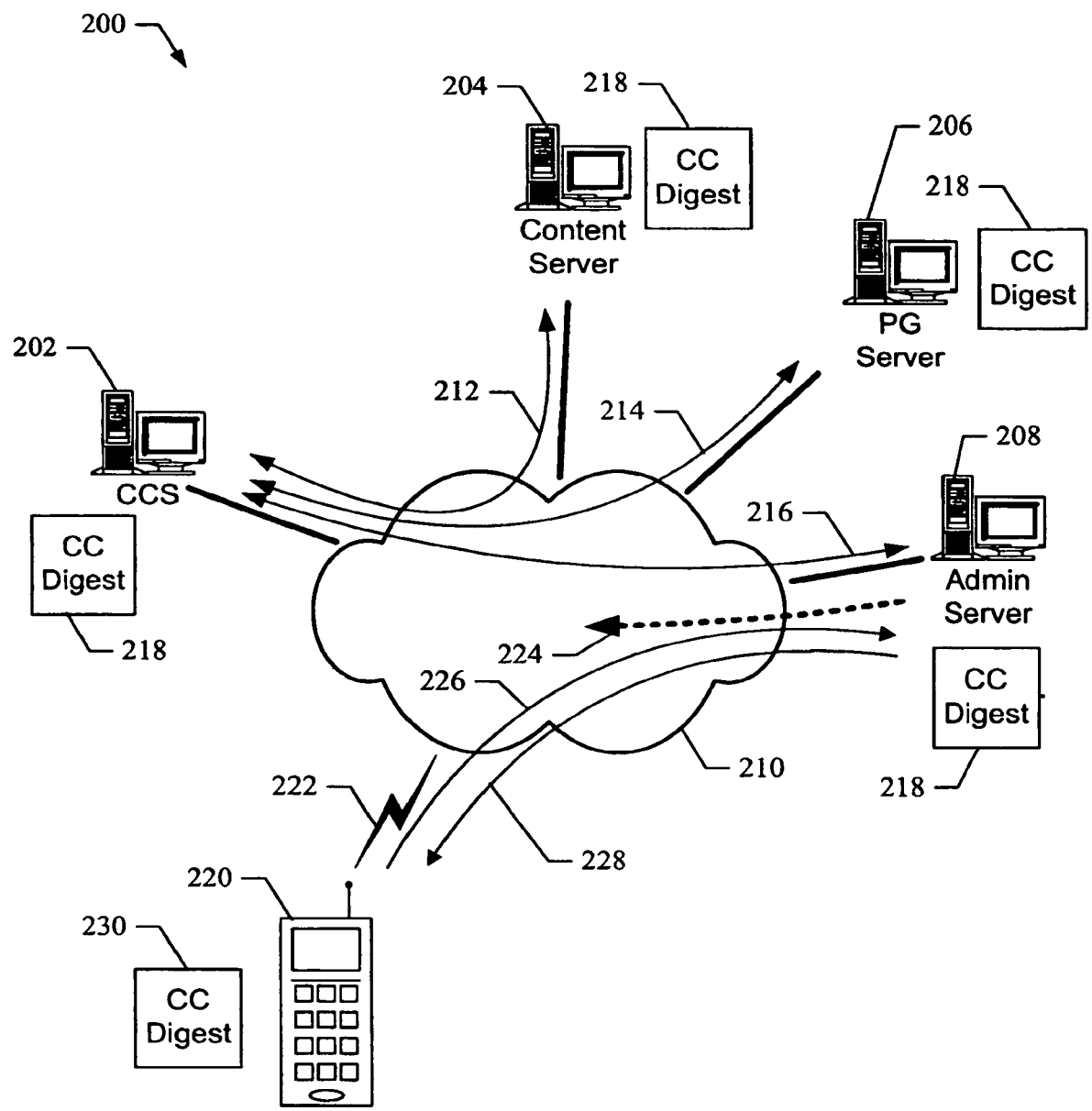
FIG. 2 shows a network that comprises one embodiment of a control channel system.

FIG. 2 shows a network 200 that comprises one embodiment of a control channel system. The network 200 comprises a control channel server (CCS) 202 that is in communication with three information servers (204, 206, and 208) utilizing a data network 210. The information servers (204, 206, and 208) operate to perform various functions for devices in communication with the network 110. For example, the server 204 may be a content server that provides content to the devices on the network 210. The server 206 may be a program guide (PG) server that provides a PG to devices on the network 210. The PG may describe the content that is available from the server 204. The server 208 may be an administrative server that provides administrative services to devices on the network 210. The administrative services may comprise support services, billing and invoices, licensing information, or any other type of service.

Each of the information servers (204, 206, and 208) maintains a server digest (not shown) that describes the current state of that server. The server digests are updated to reflect any service changes that may occur. The servers (204, 206, and 208) operate to transmit their server digests through the data network 210 to the CCS 202. For example, the server 204 transmits its server digest as shown by path 212, the server 206 transmits its server digest as shown by path 214, and the server 208 transmits its server digest as shown by path 216.

The CCS 202 operates to receive the server digests from the servers (204, 206, and 208) and assemble a CC digest 218 that describes the current state of all the servers (204, 206, and 208). The CC digest 218 may be in any suitable format and may be encrypted using any suitable encryption technology.

In one embodiment, the CCS 202 operates to transmit the CC digest 218 back to the servers (204, 206 and 208). As a result, the servers (204, 206, and 208) receive an updated copy of the CC digest 218.

A wireless device 220 is in communication with the network 210 through a wireless communication link 222. The wireless communication link 222 may comprise any suitable communication technology. The wireless device 220 may comprise any type of device, including but not limited to, a mobile telephone, PDA, email device, pager, notebook computer or any other type of device.

In one embodiment, any of the servers (204, 206, and 208) may operate to broadcast/multicast their server information over the network 210. For example, the server 208 may broadcast any of its information, as shown by path 224. As part of the broadcast, the server 208 includes its copy of the CC digest 218. Thus, any device capable of receiving the broadcast from the server 208 will be able to receive the CC digest 218.

In another embodiment, the device 220 periodically or randomly communicates with any of the servers (204, 206, and 208). For example, the device 220 communicates with the server 208, as shown by path 226. In response to the communication, the server 208 operates to transmit any requested information along with the CC digest 218 to the device, as shown by path 228. The device 220 receives the information from the server 208 along with the CC digest 218 and operates to update its locally stored copy of the digest, as shown at 230.

Therefore, a CC server (i.e., server 202) operates to provide one or more embodiments of a control channel system by performing one or more of the following functions.
1. Maintain a CC digest.
2. Receive one or more server digests from one or more servers.
3. Update the CC digest with the latest server digest information.
4. Transmit the CC digest back to the one or more servers Therefore, an information server (i.e., server 208) operates to provide one or more embodiments of a control channel system by performing one or more of the following functions.
1. Maintain a server digest.
2. Transmit the server digest to a CC server.
3. Receive a CC digest.
4. Broadcast/multicast the CC digest with any server information.
5. Receive a communication from a device.
6. Transmit server information along with the CC digest directly to the communicating device.

Thus, embodiments of the control channel system operate to efficiently provide a wireless device with a CC digest that describes the current state of a distribution system. It should be noted that the configuration of the network 200 is just one configuration, and that other network configurations are possible within the scope of the embodiments.

Figure 3:
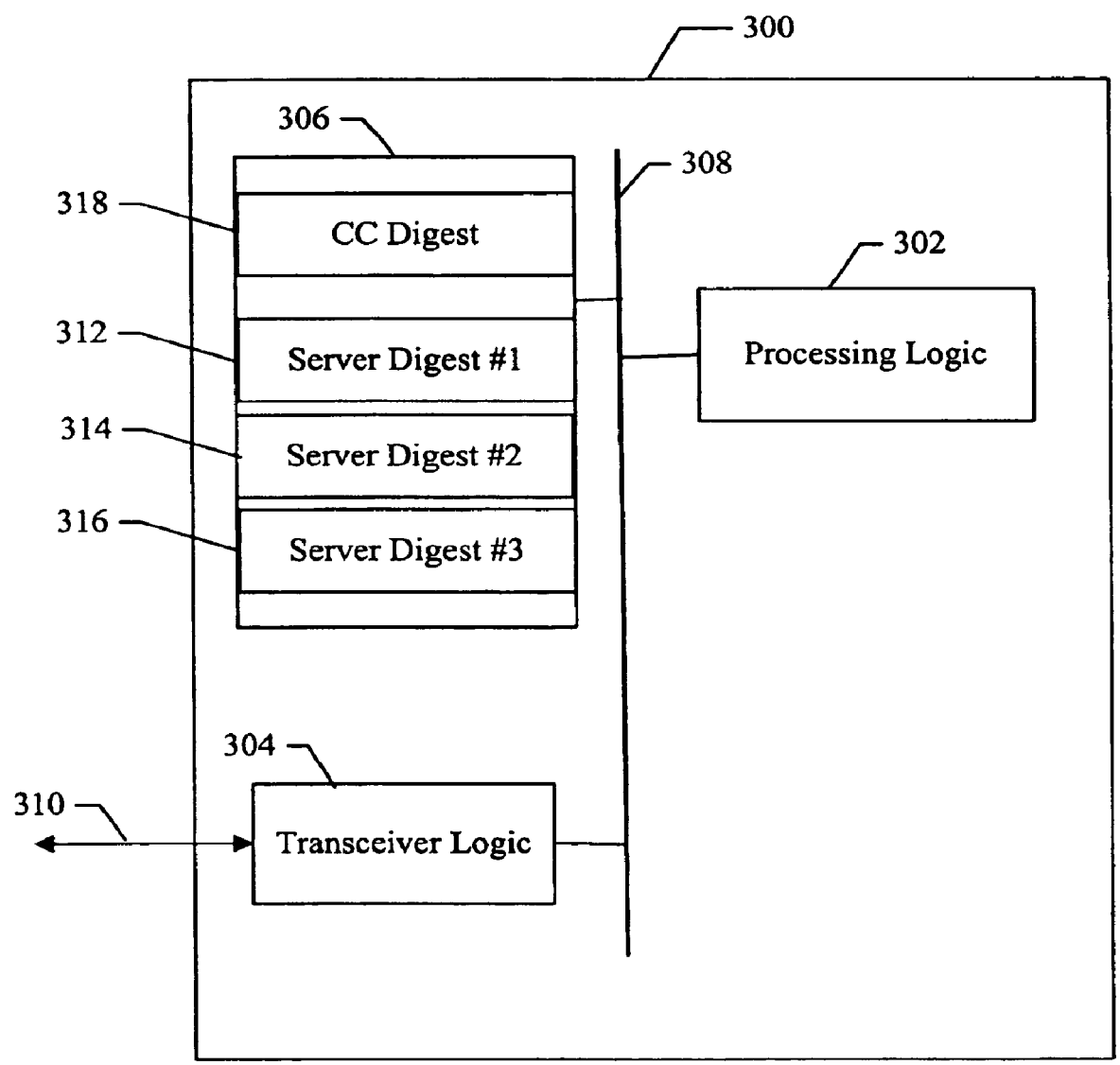
FIG. 3 shows one embodiment of a server suitable for use in embodiments of a control channel system.

FIG. 3 shows one embodiment of a server 300 for use in embodiments of a control channel system. For example, the server 300 is suitable for use as the server 102 shown in FIG. 1 or the server 202 shown in FIG. 2. The server 300 comprises processing logic 302, transceiver logic 304, and memory 306 that are coupled to an internal data bus 308.

In one or more embodiments, the processing logic 302 comprises a CPU, processor, gate array, hardware logic, memory elements, virtual machine, software, and/or any combination of hardware and software. Thus, the processing logic 302 generally comprises logic to execute machine-readable instructions and to control or communicate with one or more other functional elements of the server 300 via the internal data bus 308.

The transceiver logic 304 comprises hardware logic and/or software that operate to allow the server 300 to transmit and receive data and/or other information with remote devices or systems using communication link 310. For example, in one embodiment, the communication link 310 comprises any suitable type of communication link 310 to allow the server 300 to communicate over a network.

In one embodiment, the transceiver logic 304 comprises logic configured to receive server digests from one or more servers through the communication link 310. The transceiver logic 304 also comprises logic configured to broadcast information over a network using the communication link 310. The transceiver logic 304 also comprises logic configured directly transmit (i.e., unicast or point-to-point) information to a particular network entity, such as a network server or a wireless device, using the communication channel 310.

The memory 306 comprises any suitable memory device operable to store any type of information. For example, the memory 306 may comprise RAM, Flash memory, EEPROM, hard disk, and/or any other type of storage device. In one embodiment, the memory 306 operates to store one or more server digests that are received from one or more servers.

During operation of one or more embodiments, the server 300 received one or more server digests and stores them in the memory 306. For example, the transceiver logic 304 received the server digests (312, 314, and 316) through the communication link 310 and stores them in the memory 306. In one embodiment, the processing logic 302 operates to process server digests (312, 314, and 316) stored in the memory 306 to generate a CC digest 318 that comprises information from the stored server digests. For example, the CC digest 318 describes the current state of a distribution system. The processing logic 302 then operates to transmit the CC digest 318 to servers and/or devices on a network using the transceiver logic 304 and communication link 310.

In one embodiment, the control channel system comprises a computer program having one or more program instructions ("program instructions") stored on a computer-readable medium, which when executed by at least one processor, for instance, the processing logic 302, provides the functions described herein. For example, the program instructions may be loaded into the server 300 from a computer-readable media, such as a floppy disk, CDROM, memory card, FLASH memory device, RAM, ROM, or any other type of memory device or computer-readable medium that interfaces to the server 300. In another embodiment, the instructions may be downloaded into the server 300 from an external device or network resource that interfaces to the server 300 through the transceiver logic 304. The program instructions, when executed by the processing logic 302, provide embodiments of a control channel system as described herein.

As a result, embodiments of the control channel system operate to process received server digests to generate a CC digest that is transmitted to servers and/or devices on a data network. Thus, embodiments of the control channel system operate to efficiently deliver to servers and other devices a CC digest that describe the state of a distribution system.

Figure 4:
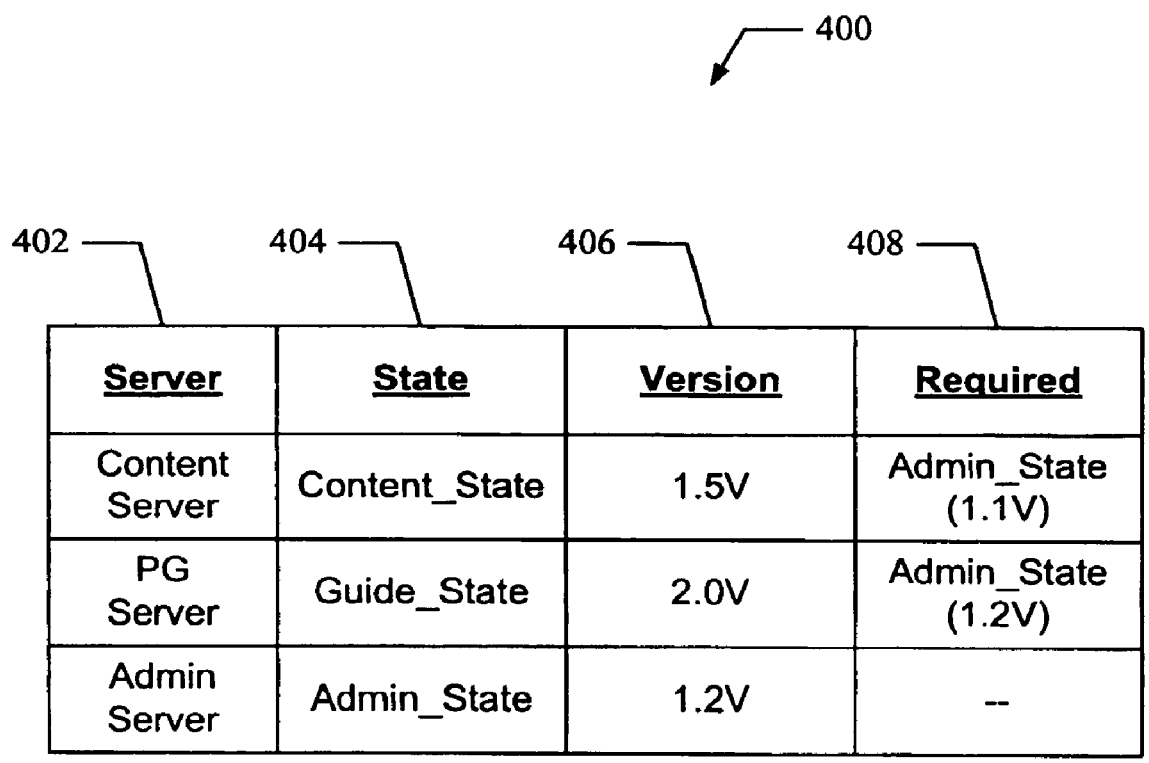
FIG. 4 shows one embodiment of a control channel digest for use in embodiments of a control channel system.

FIG. 4 shows one embodiment of a CC digest 400 for use in embodiments of a control channel system. For example, the digest 400 is suitable for use as the CC digest 318 shown in FIG. 3. In one embodiment, the CC digest 400 comprises a server identifier 402, a state identifier 404, a version identifier 406, and a requirements identifier 408.

The server identifier 402 identifies a server associated with state information contained in the CC digest 400. The state identifier 404 identifies a current state of an associated server. For example, current state of the "PG Server" is "Guide_State", which may be any type of state identifier used to identify any type of state.

The version identifier 406 identifies a version of a particular state. For example, the version of the "Guide_State" is "2.0V." The requirements identifier 408 identifies one or more other states a device would need to have in order for the device to use a particular server state. For example, if a device would like to update to the current state of the "PG Server", it would also be required to update to the at least the state of the "Admin Server" that is identified by ("Admin_State" version "1.2V"). Thus, it is possible for the CC digest to identify the current state of a particular server and to also identify one or more minimum requirements that a device should have in order to operate at the identified state. For example, the device may need to update to an identified state of one or more servers in order to update to the current state of a particular server.

It should be noted that the CC digest 400 is just one implementation, and that other implementations are possible within the scope of the embodiments.

Figure 5:
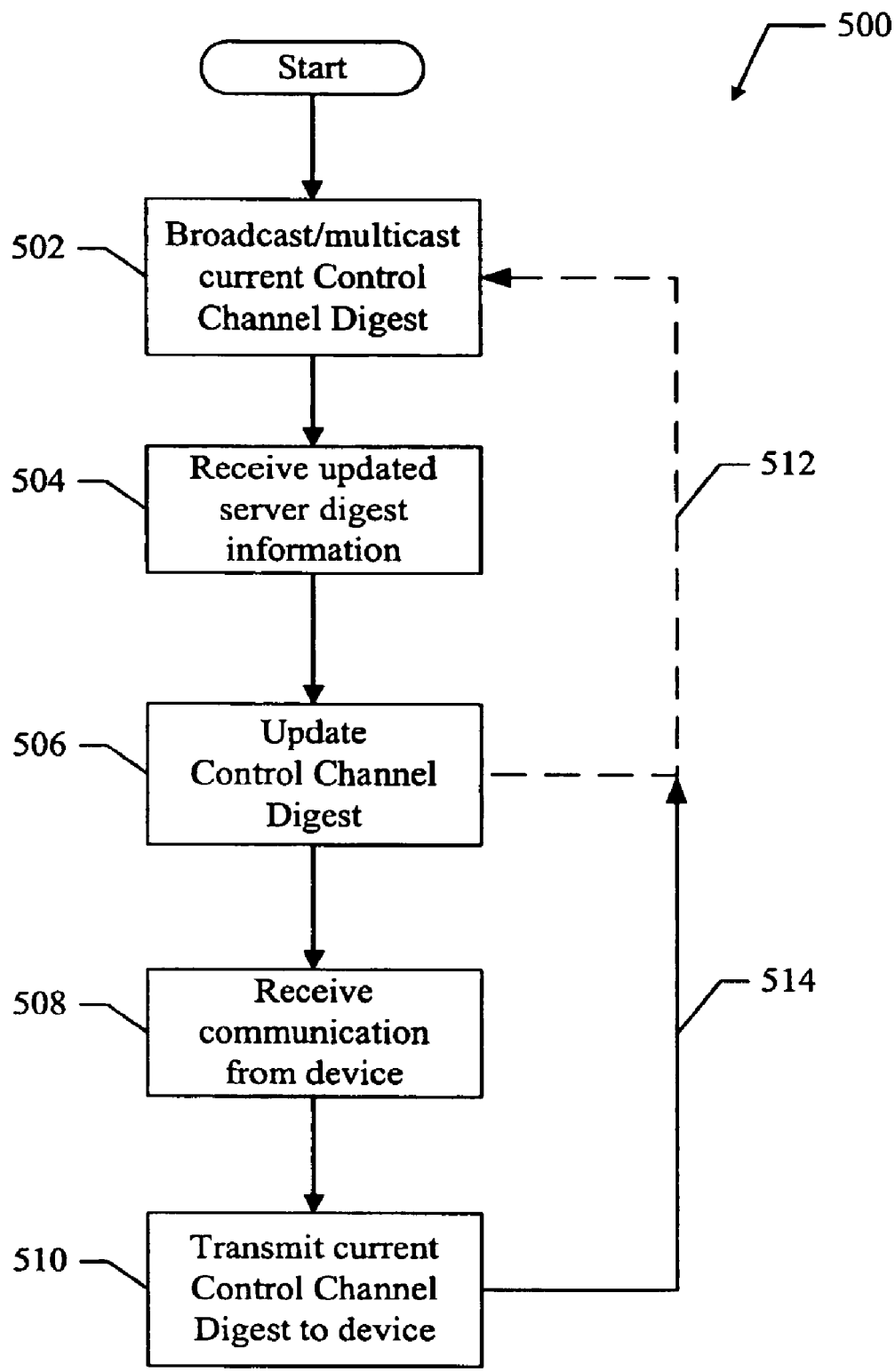
FIG. 5 shows one embodiment of a method for use in embodiments of a control channel system.

FIG. 5 shows one embodiment of a method 500 for use in embodiments of a control channel system. For clarity, the method 500 is described herein with reference to the server 300 shown in FIG. 3. For example, in one embodiment, the processing logic 302 executes machine-readable instructions to perform the functions described below.

At block 502, a broadcast/multicast of a current version of a CC digest is performed. For example, the processing logic 302 controls the transceiver logic 304 to broadcast/multicast the current version of the CC digest 318 over a data network. As a result, devices on the network may receive this version and update their locally stored copies.

At block 504, one or more server digests are received. For example, the server digests are received by the transceiver logic 304 through the communication link 310 and stored in the memory 306. The server digests are transmitted from one or more servers over a network to the server 300.

At block 506, a current version of the CC digest is updated with information from the received server digests. For example, in one embodiment, the processing logic 302 retrieves information from the received server digests stored in the memory 306 and updates the CC digest 318.

In one embodiment, the method then proceeds along path 512 to block 502 where the newly updated CC digest 318 is broadcast/multicast to devices on a network. The devices listening to the broadcast/multicast may then update their local copies of the CC digest. In another embodiment, the method proceeds to block 508.

At block 508, communications from a device are received. For example, the device may be a portable device that was previously in a power-down mode or was otherwise unavailable. Thus, the device may have missed previous broadcasts of the CC digest.

At block 510, the CC digest is transmitted to the communicating device. For example, in response to receiving communications from the device, the processing logic 302 controls the transceiver logic 304 to transmit the CC digest 318 directly to the device using the communication link 310. The method then proceeds to block 502.

Thus, the method 500 operates to provide one embodiment of a control channel system that operates to efficiently deliver a CC digest to devices on a network. It should be noted that the method 500 represents just one implementation and that other implementations are possible within the scope of the embodiments.

Figure 6:
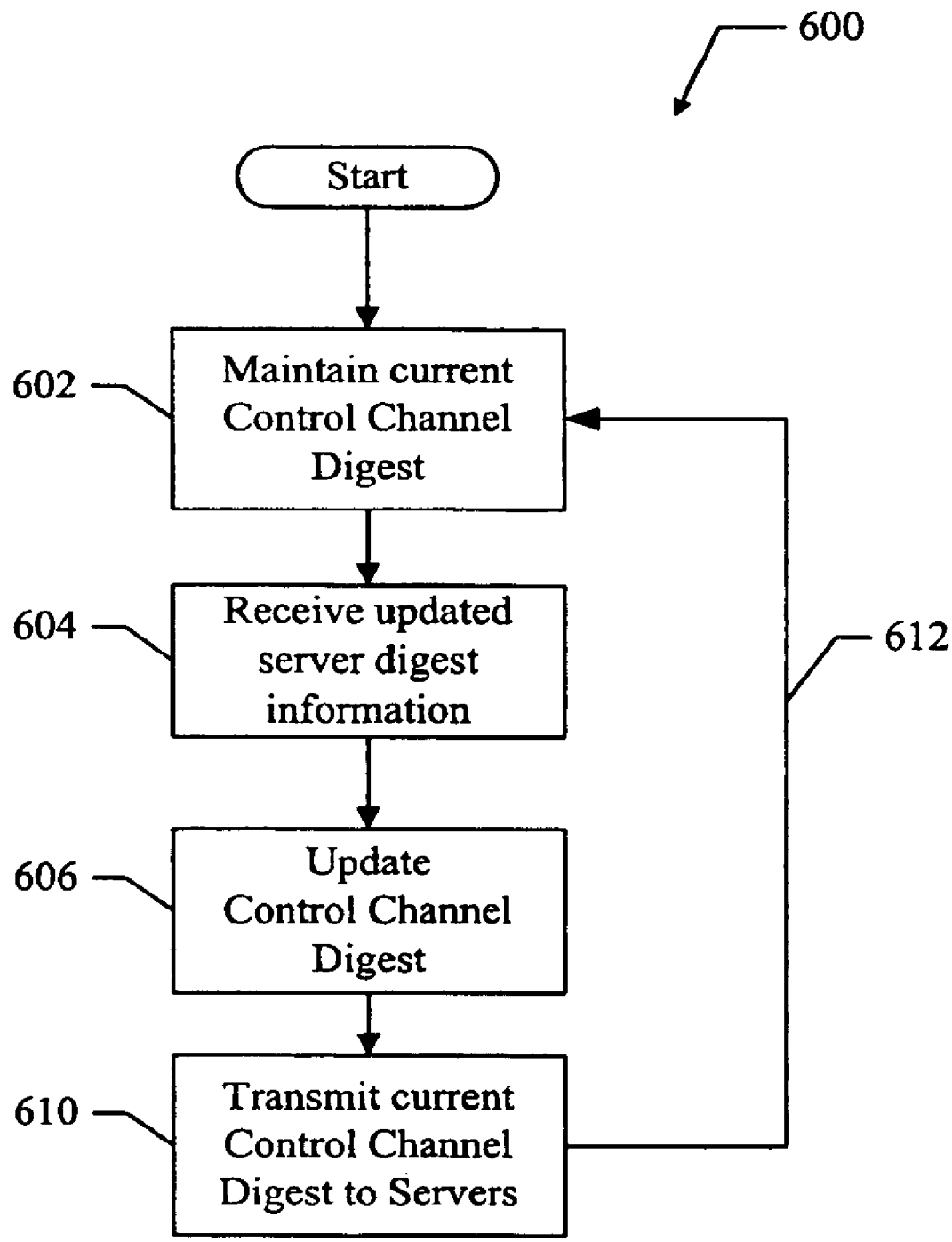
FIG. 6 shows one embodiment of a method for use in embodiments of a control channel system.

FIG. 6 shows one embodiment of a method 600 for use in embodiments of a control channel system. For clarity, the method 600 is described herein with reference to the server 300 shown in FIG. 3. For example, in one embodiment, the processing logic 302 executes machine-readable instructions to perform the functions described below.

At block 602, a CC digest is maintained. For example, in one embodiment, the processing logic 302 operates to maintain the CC digest 318 in the memory 306.

At block 604, one or more server digests are received. For example, the server digests are received by the transceiver logic 304 through the communication link 310 and stored in the memory 306. The server digests are transmitted from one or more servers over a network to the server 300.

At block 606, a current version of the CC digest is updated with information from the received server digests. For example, in one embodiment, the processing logic 302 retrieves information from the received server digests stored in the memory 306 and updates the CC digest 318.

At block 608, the updated CC digest is transmitted back to one or more servers. For example, in one embodiment, the processing logic 302 controls the transceiver logic 304 to transmit the CC digest 318 to one or more servers on a data network using the communication link 310. For example, in one embodiment, the CC digest 318 is transmitted to all servers that are part of a distribution system so that all servers will know the current state of the distribution system. Thus, the CC digest 318 may be transmitted to any number of servers so that each of the servers will have an updated copy of the CC digest 318. As a result, each server is able to provide an updated copy of the CC digest in any communications it may have with devices on a network.

Thus, the method 600 operates to provide one embodiment of a control channel system that operates to efficiently deliver a CC digest to servers on a network. It should be noted that the method 600 represents just one implementation and that other implementations are possible within the scope of the embodiments.

Figure 7:
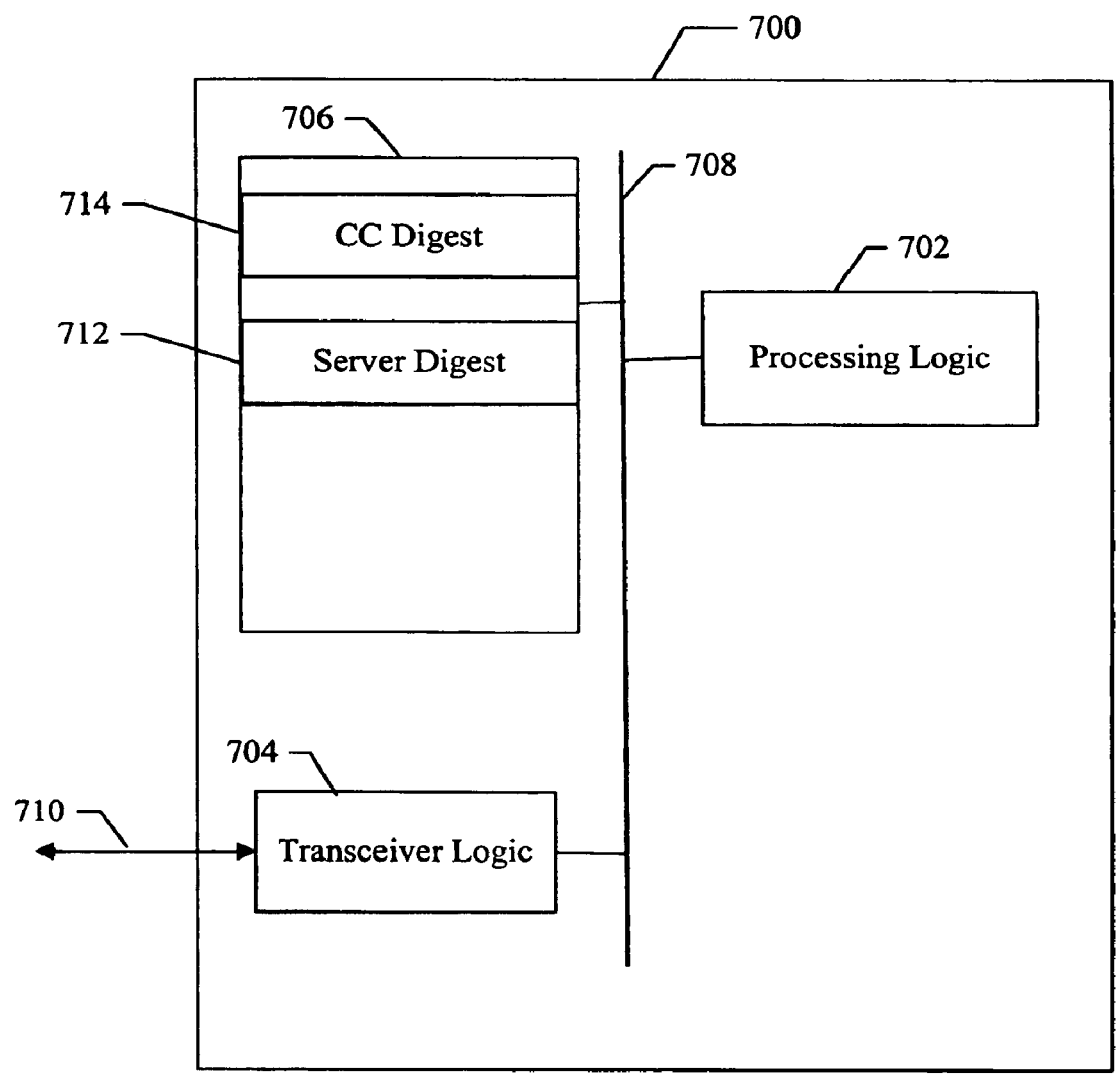
FIG. 7 shows one embodiment of an information server for use in embodiments of a control channel system.

FIG. 7 shows one embodiment of an information server 700 for use in embodiments of a control channel system. For example, the server 700 is suitable for use as any of the servers 104, 106, or 108, shown in FIG. 1. The server 700 comprises processing logic 702, transceiver logic 704, and memory 706 that are coupled to an internal data bus 708.

In one or more embodiments, the processing logic 702 comprises a CPU, processor, gate array, hardware logic, memory elements, virtual machine, software, and/or any combination of hardware and software. Thus, the processing logic 702 generally comprises logic to execute machine-readable instructions and to control or communicate with one or more other functional elements of the server 700 via the internal data bus 708.

The transceiver logic 704 comprises hardware logic and/or software that operate to allow the server 700 to transmit and receive data and/or other information with remote devices or systems using communication link 710. For example, in one embodiment, the communication link 710 comprises any suitable type of communication link 710 to allow the server 700 to communicate over a network.

In one embodiment, the transceiver logic 704 comprises logic configured to receive a CC digest from a CC server through the communication link 710. The transceiver logic 704 also comprises logic configured to broadcast information over a network using the communication link 710. The transceiver logic 704 also comprises logic configured directly transmit (i.e., unicast or point-to-point) information to a particular network entity, such as a network server or a wireless device, using the communication channel 710.

The memory 706 comprises any suitable memory device operable to store any type of information. For example, the memory 706 may comprise RAM, Flash memory, EEPROM, hard disk, and/or any other type of storage device. In one embodiment, the memory 706 operates to store one or more server digests that are maintained at the server 700.

During operation of one or more embodiments, the server 700 maintains one or more server digests and stores them in the memory 706. For example, the server digest 712 is maintained at the server 700. The server digest 712 describes the current state of the server 700. The server 700 operates to transmit the server digest 712 to a CC server using the transceiver logic 704. For example, the transceiver logic 704 transmits the server digest 712 through the communication link 710 to a CC server. In one embodiment, the transceiver logic 704 communicates with the CC server using a data network.

The CC server then operates to transmit a CC digest to the server 700. For example, the CC digest is received by the transceiver logic 704 using the communication link 710. The processing logic 702 then stores the received CC digest in the memory, as shown at 714. For example, the CC digest 714 describes the current state of a distribution system.

In one embodiment, when the server transmits its server digest 712 to devices on a data network, it also transmits the CC digest at the same time. For example, the processing logic 702 controls the transceiver logic 704 to transmit the server digest 712 and/or the CC digest 714 over a data network using the communication link 710. In another embodiment, when the server 700 receives request for information from devices on a data network, the server 700 responds to the information request and includes the CC digest 714 in its response. For example, the processing logic 702 controls the transceiver logic 704 to transmit requested information and the CC digest 714 directly to a requesting device using the communication link 710. Thus, devices requesting information from the server 700 will receive a copy of the CC digest 714.

In one embodiment, the control channel system comprises a computer program having one or more program instructions ("program instructions") stored on a computer-readable medium, which when executed by at least one processor, for instance, the processing logic 702, provides the functions described herein. For example, the program instructions may be loaded into the server 700 from a computer-readable media, such as a floppy disk, CDROM, memory card, FLASH memory device, RAM, ROM, or any other type of memory device or computer-readable medium that interfaces to the server 700. In another embodiment, the instructions may be downloaded into the server 700 from an external device or network resource that interfaces to the server 700 through the transceiver logic 704. The program instructions, when executed by the processing logic 702, provide embodiments of a control channel system as described herein.

As a result, embodiments of the control channel system operate to process received server digests to generate a CC digest that is transmitted to one or more information servers on a data network. When an information server responds to information requests from a device, it includes a copy of the CC digest so that the device will be able to determine the current state of the distribution system. Thus, embodiments of the control channel system operate to efficiently deliver to a device a CC digest that describes the state of a distribution system.

Figure 8:
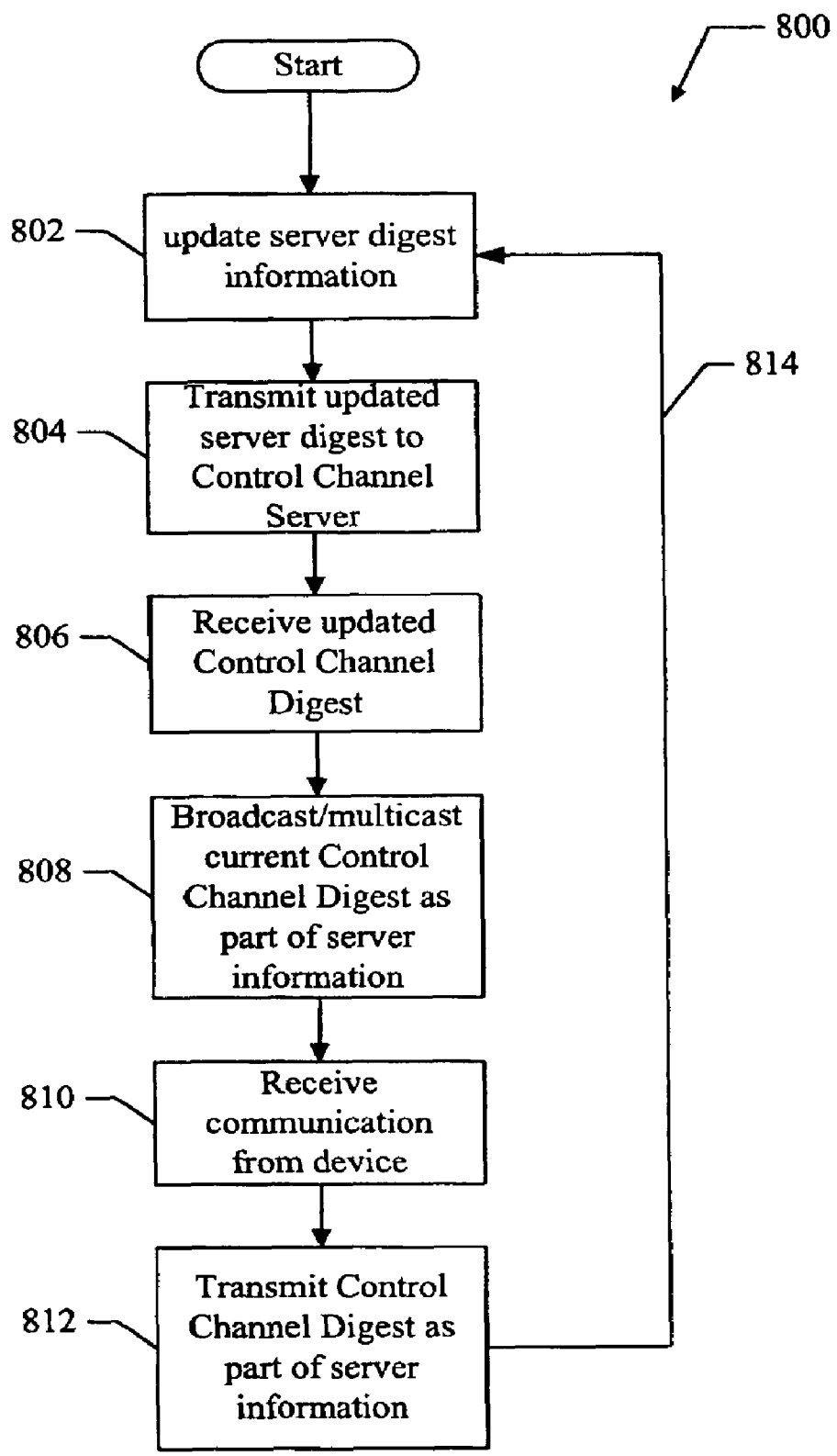
FIG. 8 shows one embodiment of a method for use in embodiments of a control channel system.

FIG. 8 shows one embodiment of a method 800 for use in embodiments of a control channel system. The method 800 is suitable for use by an information server in embodiments of a control channel system. For example, the information server may be the Admin server 108 shown in FIG. 1. For clarity and ease of description, the method 800 will be described with reference to the information server 700 shown in FIG. 7. In one embodiment, at least one processor, such as the processing logic 702, operates to perform the functions of the information server described below.

At block 802, a server digest is updated with the latest server information. For example, the processing logic 702 updates its server digest 712 with information relative to the state of content and services it provides.

At block 804, the updated server digest is transmitted to a CC server. For example, the processing logic 702 controls the transceiver logic 704 to transmit the server digest 712 to a CC server using the communication link 710.

At block 806, an updated CC digest is received. For example, a CC server transmits the CC digest 714 to the information server 700. In one embodiment, the processing logic 702 receives the CC digest 714 and stores it in the memory 706.

At block 808, the CC digest is transmitted as part of a broadcast/multicast from the information server. For example, the server 700 may broadcast or multicast administrative information to devices on a network as part of it normal operations. In addition to its own information, the received CC digest 714 is included in the transmission. In one embodiment, the transceiver logic 704 broadcasts the information and CC digest 714 over a data network using the communication link 710. Thus, any device capable of receiving the broadcast/multicast from the server 700 will be able to receive the CC digest 714.

At block 810, a device communication is received. For example, a device communicates with the server 700 to request any type of server information. For example, the device may request support or any other administrative function. In one embodiment, the device communications are received by the transceiver logic 704 and passed to the processing logic 702.

At block 812, the CC digest is transmitted with other server information. For example, the server 700 responds to the communication from the device by transmitting server information directly to the device. The server 700 operates to include the CC digest 714 as part of this transmission. Thus, any device that communicates with the server 700 will receive the CC digest 714.

Thus, the method 800 operates to provide one embodiment of a control channel system that operates to efficiently deliver a CC digest to devices on a network. It should be noted that the method 800 represents just one implementation and that other implementations are possible within the scope of the embodiments.

Figure 9:
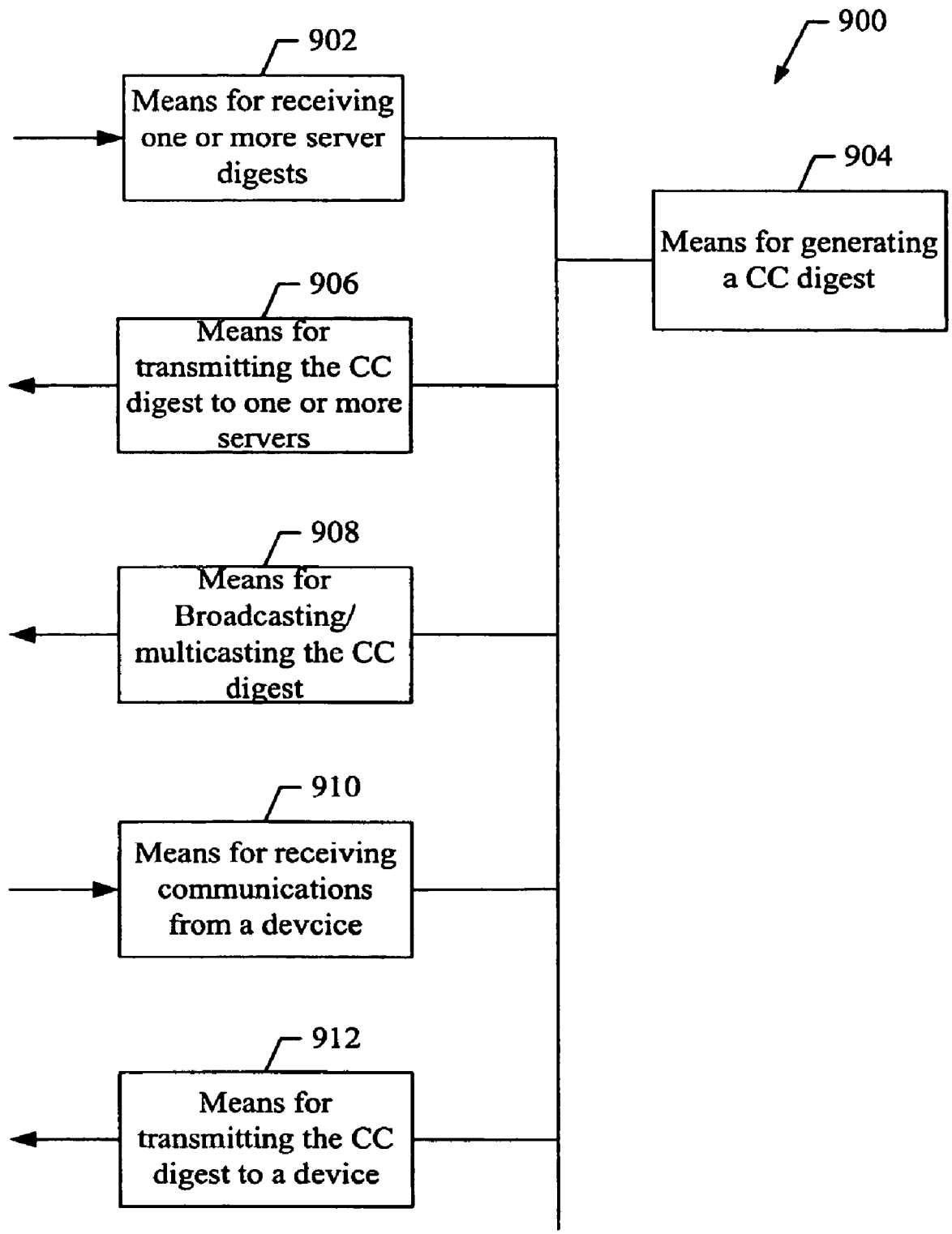
FIG. 9 shows one embodiment of a server suitable for use in embodiments of a control channel system.

FIG. 9 shows one embodiment of a CC server 900 for use in embodiments of a control channel system. For example, the CC server 900 is suitable for use as the server 102 in FIG. 1.

The CC server 900 comprises means (902) for receiving one or more server digests, means (904) for generating a CC digest, means (906) for transmitting the CC digest to one or more information servers, means (908) for broadcasting/multicasting the CC digest over a data network, means (910) for receiving communications from a device, and means (912) for transmitting the CC digest to a device.

In one or more embodiments, the means of the CC server 900 may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein.

Figure 10:
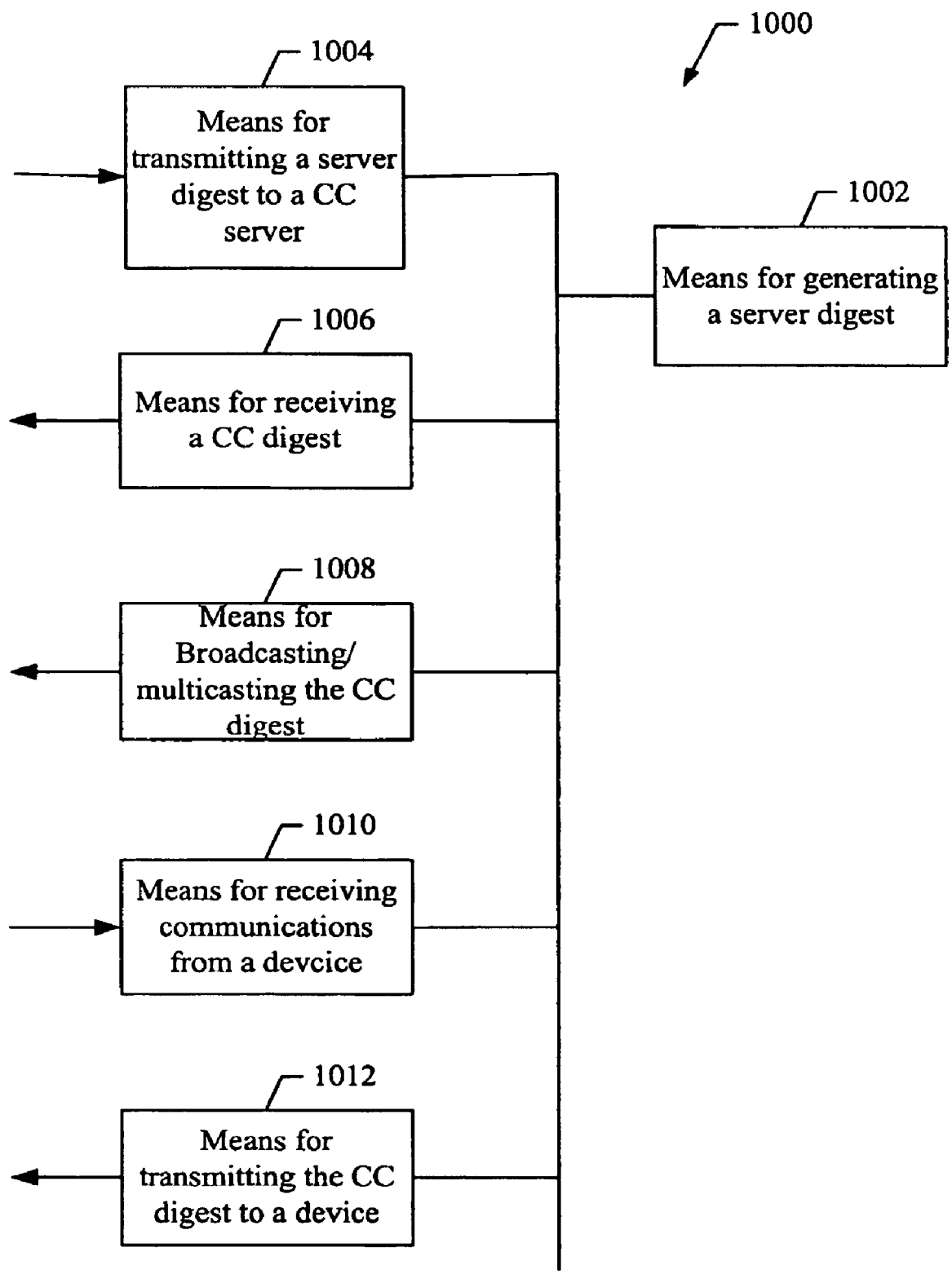
FIG. 10 shows one embodiment of an information server suitable for use in embodiments of a control channel system.

FIG. 10 shows one embodiment of an information server 1000 for use in embodiments of a control channel system. For example, the information server 1000 is suitable for use as any of the information servers 104, 106, or 108 shown in FIG. 1.

The information server 1000 comprises means (1002) for generating a server digest, means (1004) for transmitting a server digest to a CC server, means (1006) for receiving a CC digest, means (1008) for broadcasting/multicasting the CC digest over a data network, means (1010) for receiving communications from a device, and means (1012) for transmitting the CC digest to a device.

In one or more embodiments, the means of the information server 1000 may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments.

Accordingly, while embodiments of a control channel system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

What is claimed is:

1. A method for providing a control channel in a data network, the method comprising:
    receiving a plurality of server digests from a plurality of servers, each server digest including a current state of a respective server;
    generating a control channel digest from the plurality of the server digests, the control channel digest identifying a current state of a plurality of the servers and identifying minimum requirements for a wireless device to interact with an identified server;
    broadcasting the control channel digest over the data network on a control channel to a plurality of wireless devices that communicate with the one or more servers;
    receiving, at a wireless device, the control channel digest; and
    determining, based on the control channel digest, whether the wireless device must be updated to interact with at least one server.

2. The method of claim 1 further comprising:
    updating the control channel digest on a periodic basis.

3. A system for providing a control channel in a data network, the system comprising:
    means for receiving a plurality of server digests from a plurality of servers, each server digest including a current state of a respective server;
    means for generating a control channel digest from the plurality of the server digests, the control channel digest identifying a current state of a plurality of the servers and identifying minimum requirements for a wireless device to interact with an identified server; and
    means for broadcasting the control channel digest over the data network on a control channel to a plurality of wireless devices that communicate with the one or more servers; and
    a wireless device including:
        means for receiving the control channel digest; and
        means for determining, based on the control channel digest, whether the wireless device must be updated to interact with at least one server.

4. The system of claim 3 wherein the means for generating a control channel digest further comprises:
    means for updating the control channel digest on a periodic basis.

5. A system for providing a control channel in a data network, the system comprising:
    a control channel digest server that receives a plurality of server digests from a plurality of content servers, each server digest including a current state of a respective content server, generates a control channel digest based on the plurality of the server digests, the control channel digest identifying a current state of a plurality of the servers and identifying minimum requirements for a wireless device to interact with an identified server, and broadcasts the control channel digest over the data network on a control channel to a plurality of wireless devices that communicate with the one or more servers; and
    at least one wireless device that receives the control channel digest and determines, based on the control channel digest, whether the wireless device must be updated to interact with any of the content servers.

6. The system of claim 5 wherein the control channel digest server periodically updates the control channel digest.

7. A computer-readable storage medium storing a computer program, which operates to provide a control channel in a data network, the computer program causing devices in the system to perform the following steps:
    receiving a plurality of server digests from a plurality of servers, each server digest including a current state of a respective server;
    generating a control channel digest from the plurality of the server digests, the control channel digest identifying a current state of a plurality of the servers and identifying minimum requirements for a wireless device to interact with an identified server;
    broadcasting the control channel digest over the data network on a control channel to a plurality of wireless devices that communicate with the one or more servers;
    receiving, at a wireless device, the control channel digest; and
    determining, based on the control channel digest, whether the wireless device must be updated to interact with at least one server.

8. The method of claim 7 further comprising:
    updating the control channel digest on a periodic basis.

* * * * *